(12) United States Patent
Varsanik et al.

(10) Patent No.: US 11,948,399 B2
(45) Date of Patent: Apr. 2, 2024

(54) SYSTEMS AND METHODS FOR ON-THE-FLOOR DETECTION WITHOUT THE NEED FOR WEARABLES

(71) Applicant: Atlas5D, Inc., Lincoln, MA (US)

(72) Inventors: Jonathan S. Varsanik, Cambridge, MA (US); Timothy W. Chevalier, Cambridge, MA (US); Zebadiah M. Kimmel, Cambridge, MA (US)

(73) Assignee: Atlas5D, Inc., Lincoln, MA (US)

( * ) Notice: Subject to any disclaimer, the term of this patent is extended or adjusted under 35 U.S.C. 154(b) by 160 days.

(21) Appl. No.: 16/932,218

(22) Filed: Jul. 17, 2020

(65) Prior Publication Data

US 2021/0019505 A1   Jan. 21, 2021

Related U.S. Application Data

(60) Provisional application No. 62/983,472, filed on Feb. 28, 2020, provisional application No. 62/875,899, filed on Jul. 18, 2019.

(51) Int. Cl.
| | | |
|---|---|---|
| *G06F 21/62* | (2013.01) | |
| *G06V 40/20* | (2022.01) | |
| *G08B 21/04* | (2006.01) | |

(52) U.S. Cl.
CPC .......... *G06V 40/23* (2022.01); *G06F 21/6245* (2013.01); *G08B 21/043* (2013.01)

(58) Field of Classification Search
CPC ............................ G06F 21/6245; G06V 40/23
See application file for complete search history.

(56) References Cited

U.S. PATENT DOCUMENTS

| | | | |
|---|---|---|---|
| 9,341,464 | B2 | 5/2016 | Kimmel |
| 9,600,993 | B2 | 3/2017 | Kimmel |
| 9,737,239 | B2 | 8/2017 | Kimmel |
| 9,817,017 | B2 | 11/2017 | Kimmel |
| 9,974,466 | B2 | 5/2018 | Kimmel |
| 10,013,756 | B2 | 7/2018 | Kimmel et al. |
| 10,311,695 | B2 | 6/2019 | Sundholm |
| 11,017,901 | B2 | 5/2021 | Chevalier et al. |
| 2012/0242501 | A1 | 9/2012 | Tran et al. |

(Continued)

FOREIGN PATENT DOCUMENTS

| | | |
|---|---|---|
| CN | 105934781 A | 9/2016 |
| CN | 105980008 A | 9/2016 |

(Continued)

OTHER PUBLICATIONS

Grewe, L., et. al., A cyber-physical system for senior collapse detection, Proceedings of Spie, 9091: 90911K-90911K, (2014).

(Continued)

*Primary Examiner* — Yves Dalencourt
(74) *Attorney, Agent, or Firm* — Choate, Hall & Stewart LLP; Michael D. Schmitt (57) ABSTRACT

Presented herein are systems and methods for detecting that a human or other object is on-the-floor, e.g., after a fall or other means of descent to the floor. The disclosed technology does not require a historic trajectory of movement, nor does the disclosed technology require a worn device. Detection is performed by determining the configuration of the subject using environmental data, such as visual data or depth data.

20 Claims, 5 Drawing Sheets

(56) References Cited

U.S. PATENT DOCUMENTS

| | | | |
|---|---|---|---|
| 2017/0010658 A1 | 1/2017 | Tanaka et al. | |
| 2017/0172465 A1* | 6/2017 | Osorio | A61B 5/0205 |
| 2018/0333083 A1 | 11/2018 | Orellano | |
| 2020/0074175 A1* | 3/2020 | Zheng | G06F 18/251 |
| 2020/0134211 A1* | 4/2020 | Miller | G06F 21/6209 |

FOREIGN PATENT DOCUMENTS

| | | |
|---|---|---|
| CN | 108806190 A | 11/2018 |
| CN | 109920208 A | 6/2019 |
| WO | WO-2008/004314 A1 | 1/2008 |
| WO | WO-2018/026838 A1 | 2/2018 |
| WO | WO-2021/011889 A1 | 1/2021 |

OTHER PUBLICATIONS

Internatonal Search Report for PCT/US2020/042585, filed Jul. 17, 2020, 5 pages, (dated Jan. 13, 2021).

Written Opinion for PCT/US2020/042585, filed Jul. 17, 2020, 10 pages, (dated Jan. 13, 2021).

\* cited by examiner

SYSTEMS AND METHODS FOR ON-THE-FLOOR DETECTION WITHOUT THE NEED FOR WEARABLES

PRIORITY APPLICATIONS

The present application claims the benefit of U.S. Provisional Patent Application No. 62/875,899, filed on Jul. 18, 2019, and U.S. Provisional Patent Application No. 62/983,472, filed on Feb. 28, 2020, each of which is hereby incorporated by reference herein in its entirety.

TECHNICAL FIELD

The present disclosure relates generally to systems and methods to detect that an object (such as a person, animal, or other object) is on-the-floor instead of upright, e.g., after an object has fallen, or after a person has lowered himself/herself to the floor.

BACKGROUND

Automatically detecting the fall of a person—for example, an elderly person at home, or a patient in a hospital—has been an area of active research due to a rise in the aging population.

The fall in and of itself is not injurious. Rather, injury results from either: 1) impacting the ground, e.g., perhaps resulting in bone fracture, or 2) becoming trapped on the floor for a long time period, e.g., perhaps while unconscious or starving.

There are many methods, apparatuses, and systems used to detect that a fall may have happened. These typically include either a wearable, trajectory tracking, or both. But there are few, if any, solutions that can detect that a person may be positioned on the floor in the absence of information about a preceding descent.

There are many ways that a person may end up on the floor without a fall. For example, the person may realize that he/she is about to faint (say, due to diabetic hypoglycemia) and voluntarily lower himself/herself to the ground before losing consciousness. For example, the person may descend to the floor to perform an everyday task, then find that he/she lacks the strength to rise. For example, a seated person may lose consciousness or muscle tone, and slowly slide out of a chair or couch onto the floor. In general, solutions for on-the-floor detection are unable to address many important situations where a fragile person becomes positioned—potentially trapped—on the floor.

Worn devices ("wearables") include kinematic sensors, biomechanical sensors, accelerometers, and even barometric pressure sensors. In such systems, fall detection requires the receipt and accurate analysis of data from the worn device. This data may include, for example, the position, speed, and/or acceleration of the device over time. This data, taken in context, may indicate descent to the floor. For example, US Pat. Publication No. 2018-0333083 filed on Jul. 12, 2018, describes systems and methods related to fall prediction and prevention using a patient-wearable device configured to continuously capture and analyze data to determine if a fall has occurred.

Typical information gathered by fall detection devices—whether worn or non-worn ("ambient")—includes measurements of position, speed, and/or acceleration over time. Here, fall detection requires the recognition of a change in those measurements that indicate descent to the floor. For example, US Pat. Publication No. 2017-0172465 filed on Mar. 1, 2017 describes a method of detecting a fall, which utilizes trajectory and acceleration information of the individual based on images to determine if a fall is occurring or imminent.

Existing solutions are inadequate for fall detection for a variety of reasons. For example, many people are unwilling or unable to comply with wearing a fall detection device. Such individuals may find the device psychologically depressing, as it serves as a reminder of age and sickness. Moreover, some individuals may have cognitive challenges, such an inability to remember to wear or recharge the device. Furthermore, some individuals may lack the physical means to place the device. And if the descent to the ground is slow or voluntary, the device fails by definition. Therefore, existing solutions which rely on the compliance of a user with a wearable are often rejected, or fail under real-world circumstances.

Existing solutions using trajectory tracking are limited as the number of trajectories indicating descent to the floor is practically infinite. For example, a person may fall quickly, or slowly; all at once, or in stages; from a standing position, or a seated position; forward, backward, or sideways; slumping partially or collapsing fully; and so on. Existing solutions which rely on detecting the trajectory of a fall are stymied, and rendered ineffectual, by attempting impossibly to distinguish between falling and not-falling trajectories. Existing solutions also generally again require that the descent be rapid, so that they cannot pick up a slow transition to the floor.

Existing solutions can typically detect only a fall to the floor and not onto other surfaces. If a person collapses onto, for example, an object elevated above the floor such as a couch, that fall—though potentially dangerous—is unlikely to be recognized using existing solutions due to a reliance on the use of fall trajectories.

In sum, the most critical gap is that existing solutions do not address any situation where a person becomes positioned on the floor, and potentially trapped, in the absence of a preceding rapid fall.

Accordingly, there exists a need for improved systems and methods to detect a position on the floor ("on-the-floor") without requiring a worn device.

This Background section is presented for purposes of clarity and is not meant as a description of prior art with respect to any claim.

SUMMARY

Presented herein are, inter alia, systems and methods for detecting that a subject (such as a person or animal) has assumed a position on the floor (or similarly-disposed surface) based on observation of the end state after movement to the floor (such as falling down). This document uses the term "on-the-floor" for brevity, but surfaces other than a floor, such as the surface of a couch, are also encompassed. The disclosed technology does not require a historic trajectory of movement preceding or during the fall. Nor does the disclosed technology require a worn device, as the information needed may be acquired by one or more ambient sensors, e.g., ambient sensor measurements (e.g., visual data, spatial data, temperature data, and/or depth data) of physical body features in spatial relation to a surface (e.g., a floor).

For example, in certain embodiments of the technology, an ambient sensor (e.g., a depth camera) is used to gather data on a room and compute the center of mass of a human in the room with respect to a surface (e.g., the floor). If the center of mass of the human is found to be within a particular distance to the surface, the system then determines whether the human rises at least a second distance above the surface within a period of time. If the person remains within the second distance to the floor, within the given period of time, the human is determined to be on-the-floor. The technology then may relay the on-the-floor position to a third party, such as an emergency service or family member, for further action. The on-the-floor position may be due to a fall, or due to some other cause, as described earlier.

In one aspect, the invention is directed to a method of detecting that an object is on-the-floor (or on another surface), without the need for a worn sensor (e.g., and without the need for a historic trajectory of movement of the object), the method comprising: receiving, by a processor of a computing device, environmental data; automatically identifying within the environmental data, by the processor, one or more objects; automatically identifying within the environmental data, by the processor, a configuration of each of the one or more objects; and automatically determining, by the processor, an on-the-floor (or on-the-surface) status for each of the one or more objects.

In certain embodiments, the environmental data comprises one or more members selected from the group consisting of visual data, spatial data, temperature data, and depth data, e.g., and wherein the environmental data corresponds to a spatial environment of the one or more objects, e.g., at a particular instant.

In certain embodiments, the automatically identifying one or more objects utilizes one or more members selected from the group consisting of machine learning, deep learning, pattern recognition, and neural network.

In certain embodiments, the object is a member selected from the group consisting of a human, a non-human animal, and an inanimate object.

In certain embodiments, the each configuration is determined, at least in part, using one or more members selected from the group consisting of a detected center-of-mass, a pose, an aspect ratio, and locations of one or more joints.

In certain embodiments, the on-the-floor (or other surface) status is determined, at least in part, using a detected temporal duration of proximity between the object and the floor (or other surface). In certain embodiments, a non-floor surface, (e.g., such as a couch), is used rather than a floor surface.

In certain embodiments, personal or private data [e.g., personally identifying data (e.g., facial details) apart from permitted data or entered data (e.g., a username, first name, or other entered moniker) by which a system that performs the method refers to the individual object/person in its identification following detection] are removed from the environmental data. In certain embodiments, the object is a human who has fallen to a floor or other surface.

In another aspect, the invention is directed to a system for detecting on-the-floor (or other surface) status of an object, such as a human, without the need for a sensor worn by the object (e.g., and without the need for a historic trajectory of movement of the object), the system comprising: an ambient sensor; a processor; and a memory storing instructions thereon, wherein the instructions, when executed by the processor, cause the processor to: receive environmental data; automatically identify one or more objects within the environment; automatically identify a configuration for each object; and automatically determine on-the-floor status for each object.

In some aspects, a method of detecting that a subject [e.g., a human or an animal (e.g., a cat or a dog)] has fallen without the need for wearables (e.g., a sensor worn by the subject) and without detecting fall trajectories of the subject comprises receiving, by a processor of a computing device, spatially resolved data (e.g., visual data, spatial data, temperature data, depth data) corresponding to an environment at a particular instant. The method may comprise (e.g., automatically) identifying, by the processor, (e.g., using machine learning, using pattern recognition) one or more subjects within the environment based, at least in part, on the spatially resolved data. The method may comprise (e.g., automatically) identifying, by the processor, a subject configuration (e.g., (e.g., automatically) identifying one or more members of the group consisting of a center-of-mass, a pose, an aspect ratio, and one or more joint locations of the first subject) of a first of the one or more subjects based on the spatially resolved data. The method may comprise (e.g., automatically) determining, by the processor, for the first subject a fall status (e.g., a binary status corresponding to whether or not the subject has fallen) based, at least in part, on the (e.g., automatically) identified subject configuration of the first subject.

In some embodiments, the spatially resolved data is received from one or more ambient sensors [e.g., an optical camera, a bolometer (e.g., an infrared camera), or an acoustic sensor]. In some embodiments, the method comprises generating, by the processor, the spatially resolved data using the one or more ambient sensors [e.g., an optical camera, a bolometer (e.g., an infrared camera), or an acoustic sensor]. In some embodiments, the fall status is determined within a period of time from the particular instant, wherein the period of time is no more than two minutes (e.g., no more than 1 minute, 30 seconds, 15 seconds, 10 seconds, 5 seconds, or 1 second).

In some embodiments, the method comprises removing any personally identifying data from the spatially resolved data. In some embodiments, the spatially resolved data does not comprise personally identifying data.

In some embodiments, the method comprises receiving, by the processor, preliminary spatially resolved data comprising the personally identifying data. The method may comprise generating, by the processor, the spatially resolved data by removing the personally identifying data from the preliminary spatially resolved data.

In some embodiments, the spatially resolved data is depth data. In some embodiments, the method comprises preprocessing (e.g., thresholding, resizing, filtering, obscuring, normalization) the spatially resolved data.

In some embodiments, the method comprises sending, by the processor, an alert comprising the fall status (e.g., to an automated monitoring service, a caregiver, or an emergency provider).

In some embodiments, the one or more subjects are one or more humans. In some embodiments, the subject configuration comprises one or more members of the group consisting of a center-of-mass, a pose, an aspect ratio, and one or more joint locations of the subject.

In some aspects, a system for detecting that a subject [e.g., a human or an animal (e.g., a cat or a dog)] has fallen without the need for wearables (e.g., a sensor worn by the subject) and without detecting fall trajectories of the subject comprises: an ambient sensor; a processor; and a memory storing instructions thereon, wherein the instructions, when executed by the processor, cause the processor to: receive spatially resolved data (e.g., visual data, spatial data, temperature data, depth data) corresponding to an environment at a particular instant. The instructions, when executed by the processor, may further cause the processor to (e.g., automatically) identify (e.g., using machine learning, using pattern recognition) one or more subjects within the environment based, at least in part, on the spatially resolved data. The instructions, when executed by the processor, may further cause the processor to (e.g., automatically) identify a subject configuration (e.g., (e.g., automatically) identify one or more members of the group consisting of a center-of-mass, a pose, an aspect ratio, and one or more joint locations of the first subject) of a first of the one or more subjects based, at least in part, on the spatially resolved data. The instructions, when executed by the processor, may further cause the processor to (e.g., automatically) determine for the first subject a fall status (e.g., a binary status corresponding to whether or not the subject has fallen) based, at least in part, on the (e.g., automatically) identified subject configuration of the first subject.

In some embodiments, the ambient sensor comprises a member selected from the group consisting of: an optical camera, a bolometer (e.g., an infrared camera), and an acoustic sensor.

In some embodiments, the subject configuration comprises one or more members of the group consisting of: a center-of-mass, pose, aspect ratio, and one or more joint locations of the subject.

In some embodiments, the instructions, when executed by the processor, cause the processor to remove any personally identifying data from the spatially resolved data. In some embodiments, the instructions, when executed by the processor, cause the processor to: receive preliminary spatially resolved data comprising the personally identifying data using the ambient sensor; and generate the spatially resolved data by removing the personally identifying data from the preliminary spatially resolved data set.

In some embodiments, the spatially resolved data is depth data. In some embodiments, the instructions, when executed by the processor, cause the processor to preprocess (e.g., threshold, resize, filter, obscure, normalize) the spatially resolved data.

In some embodiments, the instructions, when executed by the processor, cause the processor to send an alert comprising the fall status (e.g., to an automated monitoring service, a caregiver, or an emergency provider).

In some embodiments, the one or more subjects are one or more humans.

In some aspects, a method of detecting that a subject [e.g., a human or an animal (e.g., a cat or a dog)] has fallen without the need for wearables (e.g., a sensor worn by the subject) and/or without detecting fall trajectories of the subject comprises receiving, by a processor of a computing device, spatially resolved data (e.g., visual data, spatial data, temperature data, depth data) corresponding to an environment at a particular instant. The method may comprise (e.g., automatically) identifying (e.g., using machine learning, using pattern recognition), by the processor, one or more subjects within the environment based, at least in part, on the spatially resolved data. The method may comprise (e.g., automatically) identifying, by the processor, a first subject configuration for a first of the one or more subjects (e.g., (e.g., automatically) identifying one or more members of the group consisting of a center-of-mass, a pose, an aspect ratio, and one or more joint locations of the first subject) based, at least in part, on the spatially resolved data. The method may comprise (e.g., automatically) identifying, by the processor, one or more surfaces (e.g., a floor, a surface of a piece of furniture, a surface of a stair) within the environment based, at least in part, on the spatially resolved data. The method may comprise (e.g., automatically) identifying, by the processor, a first surface configuration of a first of the one or more surfaces based, at least in part, on the spatially resolved data. The method may comprise (e.g., automatically) determining, by the processor, a first spatial measurement (e.g., a shortest distance between the first subject and the first surface) using the first subject configuration and the first surface configuration. The method may comprise (e.g., automatically) determining, by the processor, a fall status (e.g., a binary status corresponding to whether or not the subject has fallen) for the first of the one or more subjects based, at least in part, on the (e.g., automatically) identified first subject configuration and/or the first spatial measurement.

In some embodiments, the spatially resolved data is received from one or more ambient sensors [e.g., an optical camera, a bolometer (e.g., an infrared camera), or an acoustic sensor]. In some embodiments, the method comprises generating, by the processor, the spatially resolved data using one or more ambient sensors [e.g., an optical camera, a bolometer (e.g., an infrared camera, or an acoustic sensor]. In some embodiments, the one or more ambient sensors comprise one or more members of the group consisting of: an optical camera, a bolometer (e.g., an infrared camera), and an acoustic sensor.

In some embodiments, (e.g., automatically) determining the surface configuration comprises determining, by the processor, a surface normal to the surface, an isolated plane of the surface, or a lowest plane.

In some embodiments, the fall status is determined within a period of time from the particular instant, wherein the period of time is no more than two minutes (e.g., no more than 1 minute, 30 seconds, 15 seconds, 10 seconds, 5 seconds, or 1 second).

In some embodiments, the method comprises removing any personally identifying data from the spatially resolved data. In some embodiments, the spatially resolved data does not comprise personally identifying data. In some embodiments, the method comprises receiving, by the processor, preliminary spatially resolved data comprising the personally identifying data; and generating, by the processor, the spatially resolved data by removing the personally identifying data from the preliminary spatially resolved data.

In some embodiments, the spatially resolved data is depth data. In some embodiments, the method comprises preprocessing (e.g., thresholding, resizing, filtering, obscuring, normalization) the spatially resolved data.

In some embodiments, the method comprises sending, by the processor, an alert comprising the fall status (e.g., to an automated monitoring service, a caregiver, or an emergency provider).

In some embodiments, at least one of the one or more surfaces is a floor. In some embodiments, the one or more subjects are one or more humans. In some embodiments, the surface configuration comprises a collection of points and/or a plane defining a spatial location of a surface within the environment.

In some embodiments, the method comprises: (e.g., automatically) identifying, by the processor, a second surface configuration of a second surface based, at least in part, on the spatially resolved data. The method may comprise (e.g., automatically) determining, by the processor, a second spatial measurement (e.g., a shortest distance between the first subject and the second surface) using the first subject configuration and the second surface configuration. The method may comprise (e.g., automatically) further determining, by the processor, the fall status (e.g., a binary status corresponding to whether or not the subject has fallen) for the first subject based, at least in part, on the second spatial measurement.

In some aspects, a system for detecting that a subject [e.g., a human or an animal (e.g., a cat or a dog)] has fallen without the need for wearables (e.g., a sensor worn by the subject) and/or without detecting fall trajectories of the subject comprises: an ambient sensor; a processor; and a memory storing instructions thereon, wherein the instructions, when executed by the processor, cause the processor to: receive spatially resolved data (e.g., visual data, spatial data, temperature data, depth data) corresponding to an environment at a particular instant. The instructions, when executed by the processor, may further cause the processor to (e.g., automatically) identify (e.g., using machine learning, using pattern recognition), by the processor, one or more subjects within the environment based, at least in part, on the spatially resolved data. The instructions, when executed by the processor, may further cause the processor to (e.g., automatically) identify a first subject configuration for a first of the one or more subjects (e.g., (e.g., automatically) identify one or more members of the group consisting of a center-of-mass, a pose, an aspect ratio, and one or more joint locations of the first subject). The instructions, when executed by the processor, may further cause the processor to (e.g., automatically) identify one or more surfaces (e.g., a floor, a surface of a piece of furniture, a surface of a stair) within the environment based, at least in part, on the spatially resolved data. The instructions, when executed by the processor, may further cause the processor to (e.g., automatically) identify a first surface configuration of a first of the one or more surfaces. The instructions, when executed by the processor, may further cause the processor to (e.g., automatically) determine a first spatial measurement (e.g., a shortest distance between the first subject and the first surface) using the first subject configuration and the first surface configuration. The instructions, when executed by the processor, may further cause the processor to (e.g., automatically) determine for the first subject a fall status (e.g., a binary status corresponding to whether or not the subject has fallen) based, at least in part, on the (e.g., automatically) identified first subject configuration and/or the first spatial measurement.

The instructions, when executed by the processor, may cause the processor to determine the fall status based, at least in part on, the first surface configuration. The instructions, when executed by the processor, may cause the processor to determine the surface configuration, wherein the determination comprises determining a surface normal of the surface, an isolated plane of the surface, or a lowest plane.

In some embodiments, the ambient sensor comprises one or more members selected from the group consisting of: an optical camera, a bolometer (e.g., an infrared camera), and an acoustic sensor. The instructions, when executed by the processor, may cause the processor to generate the spatially resolved data using the ambient sensor.

The instructions, when executed by the processor, may further cause the processor to determine the fall status within a period of time from the particular instant, wherein the period of time is no more than two minutes (e.g., no more than 1 minute, 30 seconds, 15 seconds, 10 seconds, 5 seconds, or 1 second).

The instructions, when executed by the processor, may further cause the processor to remove any personally identifying data from the spatially resolved data. In some embodiments, the spatially resolved data is depth data. The instructions, when executed by the processor, may further cause the processor to preprocess (e.g., threshold, resize, filter, obscure, normalize) the spatially resolved data.

The instructions, when executed by the processor, may cause the processor to send an alert comprising the fall status (e.g., to an automated monitoring service, a caregiver, or an emergency provider).

In some embodiments, at least one of the one or more surfaces is a floor. In some embodiments, the one or more subjects are one or more humans. In some embodiments, the surface configuration comprises a collection of points and/or a plane defining a spatial location of the surface within the environment.

The instructions, when executed by the processor, may further cause the processor to automatically identify a second surface configuration of a second surface based, at least in part, on the spatially resolved data. The instructions, when executed by the processor, may further cause the processor to automatically determine a second spatial measurement (e.g., a shortest distance between the first subject and the second surface) using the first subject configuration and the second surface configuration. The instructions, when executed by the processor, may further cause the processor to automatically further determine the fall status (e.g., a binary status corresponding to whether or not the subject has fallen) for the first subject based, at least in part, on the second spatial measurement.

In some aspects, a method of detecting that a subject [e.g., a human or an animal (e.g., a cat or a dog)] has fallen without the need for wearables (e.g., a sensor worn by the subject) and/or without detecting fall trajectories of the subject comprises receiving, by a processor of a computing device, a first spatially resolved data set (e.g., a visual data set, a spatial data set, a temperature data set, a depth data set) corresponding to an environment at a particular instant. The method may comprise automatically identifying, by the processor, a first subject configuration of a subject (e.g., automatically identifying one or more members of the group consisting of a center-of-mass, a pose, an aspect ratio, and one or more joint locations of the first subject) and a first surface configuration of a surface (e.g., a floor, a surface of an piece of furniture, a top surface of a stair), the subject and the surface being within the environment. The method may comprise (e.g., automatically) determining, by the processor, a first spatial measurement (e.g., a shortest distance between the first subject and the first surface) using the first subject configuration and the first surface configuration. The method may comprise (e.g., automatically) determining, by the processor, whether the first spatial measurement satisfies a first condition (e.g., is no greater than a first value). The method may comprise (e.g., automatically) determining, by the processor, a fall status corresponding to the subject having fallen (e.g., a binary status corresponding to whether or not the subject has fallen) based on an elapsed time the first spatial measurement satisfies a second condition (e.g., a time period during which the spatial measurement is no greater than a second value).

In some embodiments, the method comprises (e.g., automatically) determining, by the processor, a fall status corresponding to the subject having fallen (e.g., a binary status corresponding to whether or not the subject has fallen) based on a floor count exceeding a floor count threshold (e.g., 20 seconds, 30 seconds, 1 minute, 5 minutes).

In some embodiments, the method comprises (e.g., automatically) receiving, by the processor, a second spatially resolved data set from a second instant that is a period of time after the first instant, the subject being within the environment at the second instant (e.g., and having moved or not). The method may comprise (e.g., automatically) identifying, by the processor, a second subject configuration of the subject based, at least in part, on the second spatially resolved data set. The method may comprise (e.g., automatically) determining, by the processor, a second spatial measurement between the second subject configuration and the first surface configuration. The method may comprise (e.g., automatically) determining, by the processor, whether the second spatial measurement satisfies the second condition. The method may comprise (e.g., automatically) incrementing, by the processor, a floor count if the second spatial measurement satisfies the second condition. The method may comprise (e.g., automatically) resetting, by the processor, the floor count to a base value (e.g., zero) (e.g., when the second spatial measurement no longer satisfies the second condition, but satisfies the first condition).

In some embodiments, the first surface configuration comprises a collection of points and/or a plane defining a spatial location of the surface within the environment. In some embodiments, the first spatial measurement comprises a distance (e.g., an average distance, a smallest distance, or a largest distance) using the surface configuration and the subject configuration. In some embodiments, the spatially resolved data is received from one or more ambient sensors [e.g., an optical camera, a bolometer (e.g., an infrared camera), or an acoustic sensor].

In some embodiments, the method comprises generating, by the processor, the spatially resolved data using one or more ambient sensors [e.g., an optical camera, a bolometer (e.g., an infrared camera), or an acoustic sensor]. In some embodiments, the method comprises removing any personally identifying data from the spatially resolved data. In some embodiments, the spatially resolved data does not comprise personally identifying data. In some embodiments, the method comprises receiving, by the processor, a preliminary spatially resolved data set comprising the personally identifying data; and generating, by the processor, the spatially resolved data by removing the personally identifying data from the preliminary spatially resolved data set.

In some embodiments, the spatially resolved data set is depth data. In some embodiments, the method comprises preprocessing (e.g., thresholding, resizing, filtering, obscuring, normalization) the spatially resolved data.

In some embodiments, the method comprises sending, by the processor, an alert comprising the fall status (e.g., to an automated monitoring service, a caregiver, or an emergency provider).

In some embodiments, the subject is a human. In some embodiments, the surface is a floor.

In some embodiments, (e.g., automatically) determining the surface configuration comprises determining, by the processor, a surface normal to the surface, an isolated plane of the surface, or a lowest plane.

In some aspects, a system for detecting that a subject [e.g., a human or an animal (e.g., a cat or a dog)] has fallen without the need for wearables (e.g., a sensor worn by the subject) and/or without detecting fall trajectories of the subject, the system comprising: an ambient sensor; a processor; a memory storing instructions thereon, wherein the instructions, when executed by the processor, cause the processor to receive a spatially resolved data set (e.g., a visual data set, a spatial data set, a temperature data set, a depth data set) corresponding to an environment at a particular instant. The instructions, when executed by the processor, may further cause the processor to (e.g., automatically) identify a first subject configuration of a subject (e.g., (e.g., automatically) identify one or more members of the group consisting of a center-of-mass, a pose, an aspect ratio, and one or more joint locations of the first subject) and a first surface configuration of a surface (e.g., a floor, a surface of an piece of furniture, a top surface of a stair), the subject and the surface being within the environment. The instructions, when executed by the processor, may further cause the processor to (e.g., automatically) determine a first spatial measurement (e.g., a shortest distance between the first subject and the first surface) using the first subject configuration and the first surface configuration. The instructions, when executed by the processor, may further cause the processor to (e.g., automatically) determine whether the first spatial measurement satisfies a first condition (e.g., is no greater than a first distance). The instructions, when executed by the processor, may further cause the processor to (e.g., automatically) determine a fall status corresponding to the subject having fallen (e.g., a binary status corresponding to whether or not the subject has fallen) based on an elapsed time a second condition (e.g., is no greater than a second distance) remains satisfied.

The instructions, when executed by the processor, may further cause the processor to (e.g., automatically) increment a floor count if the spatial measurement continues to satisfy the second condition. The instructions, when executed by the processor, may further cause the processor to (e.g., automatically) determine a fall status corresponding to the subject having fallen (e.g., a binary status corresponding to whether or not the subject has fallen) based on the floor count exceeding a floor count threshold (e.g., 20 seconds, 30 seconds, 1 minute, 5 minutes).

In some embodiments, the ambient sensor comprises a member selected from the group consisting of: an optical camera, a bolometer (e.g., an infrared camera), and an acoustic sensor.

The instructions, when executed by the processor, may further cause the processor to (e.g., automatically) receive a second spatially resolved data set from a second instant that is a period of time after the first instant, the subject being within the environment at the second instant (e.g., and having moved or not). The instructions, when executed by the processor, may further cause the processor to (e.g., automatically) identify a second subject configuration of the subject based, at least in part, on the second spatially resolved data set. The instructions, when executed by the processor, may further cause the processor to (e.g., automatically) determine a second spatial measurement between the second subject configuration and the first surface configuration. The instructions, when executed by the processor, may further cause the processor to (e.g., automatically) determine the second spatial measurement satisfies the second condition. The instructions, when executed by the processor, may further cause the processor to (e.g., automatically) increment the floor count if the second spatial measurement satisfies the second condition.

The instructions, when executed by the processor, may further cause the processor to (e.g., automatically) reset the floor count to a base value (e.g., zero) (e.g., when the second spatial measurement no longer satisfies the second condition, but satisfies the first condition).

In some embodiments, the surface configuration comprises a collection of points and/or a plane defining a spatial location of the surface within the environment. In some embodiments, the first spatial measurement comprises a distance (e.g., an average distance, a closest distance, or a largest distance) between the first surface configuration and the first subject configuration.

The instructions, when executed by the processor, may further cause the processor to generate the spatially resolved data using the ambient sensor. The instructions, when executed by the processor, may further cause the processor to remove any personally identifying data from the spatially resolved data. In some embodiments, the spatially resolved data is depth data. The instructions, when executed by the processor, may further cause the processor to preprocess (e.g., threshold, resize, filter, obscure, normalize) the spatially resolved data.

The instructions, when executed by the processor, may further cause the processor to send an alert comprising the fall status (e.g., to an automated monitoring service, a caregiver, or an emergency provider).

In some embodiments, the subject is a human. In some embodiments, the system comprises two or more ambient sensors. In some embodiments, the surface is a floor.

In some embodiments, (e.g., automatically) determining the surface configuration comprises determining, by the processor, a surface normal to the surface, an isolated plane of the surface, or a lowest plane.

In some aspects, a method of detecting that a subject [e.g., a human or an animal (e.g., a cat or a dog)] has fallen without the need for wearables or trajectories comprises receiving, by a processor of a computing device, spatially resolved data (e.g., visual data, spatial data, temperature data, depth data) corresponding to an environment at a particular instant. The method may comprise (e.g., automatically) identifying, by the processor, a subject configuration of a subject (e.g., one or more of a center-of-mass, pose, aspect ratio, and one or more joint locations of the subject) and a floor configuration of a floor, the subject and the floor being within the environment. The method may comprise (e.g., automatically) determining, by the processor, a first spatial measurement reflective of a positional relationship between the subject and the floor (e.g., a center-of-mass of the subject relative to the floor), said first spatial measurement determined using the (e.g., automatically) identified subject configuration and the (e.g., automatically) identified floor configuration. The method may comprise (e.g., automatically) determining, by the processor, whether the first spatial measurement satisfies a first condition (e.g., is within a first measurement threshold) (e.g., is no greater than a first distance). The method may comprise (e.g., automatically) incrementing, by the processor, a floor count if (e.g., when) the spatial measurement satisfies the first condition (e.g., is within the first measurement threshold). The method may comprise (e.g., automatically) determining, by the processor, a fall status corresponding to the subject having fallen (e.g., a binary status corresponding to whether or not the subject has fallen) based on the floor count exceeding a floor count threshold.

In some embodiments, the method further comprises (e.g., automatically) receiving second spatially resolved data from a second instant that is a period of time after the first instant, the subject being within the environment at the second instant (e.g., and having moved or not). The method may comprise (e.g., automatically) identifying, by the processor, a second subject configuration of the subject based, at least in part, on the second spatially resolved data. The method may comprise (e.g., automatically) determining, by the processor, a second spatial measurement using the second subject configuration and the floor configuration. The method may comprise (e.g., automatically) determining, by the processor, whether the second spatial measurement satisfies a second condition [e.g., is within a second measurement threshold (e.g., that is the same or different from (e.g., greater than or less than) the first measurement threshold)] (e.g., that is the same or different from the first condition).

The method may comprise (e.g., automatically) incrementing, by the processor, the floor count if the second spatial measurement satisfies the second condition (e.g., is within the second measurement threshold). In some embodiments, the method comprises (e.g., automatically) determining, by the processor, the second spatial measurement satisfies the second condition (e.g., is within the second measurement threshold); and (e.g., automatically) incrementing, by the processor, the floor count.

In some embodiments, the method comprises (e.g., automatically) determining, by the processor, the second spatial measurement satisfies the second condition (e.g., is within the second measurement threshold); and (e.g., automatically) resetting, by the processor, the floor count to an initial value (e.g., zero). In some embodiments, the method comprises first determining that the first spatial measurement does not satisfy the first condition and subsequently determining, by the processor, that the second spatial measurement satisfies the second condition, prior to resetting the floor count to the initial value.

In some embodiments, the method comprises (e.g., automatically) determining, by the processor, the second spatial measurement does not satisfy the second condition (e.g., and/or the first condition) (e.g., is not within the second measurement threshold); and subsequently resetting, by the processor, the floor count to an initial value (e.g., after a subsequent determination, by the processor, that a third spatial measurement determined from spatially resolved data at a third instant a period of time after the second instant does satisfy the first condition and/or the second condition).

In some embodiments, the method comprises determining, by the processor, that a second spatial measurement using (i) a second subject configuration determined, by the processor, from spatially resolved data at a second instant a period of time (e.g., no more than 5 seconds, 10 seconds, 30 seconds, or 1 minute) after the first instant and (ii) the second spatial measurement does satisfy the first condition and/or a second condition; and, optionally, resetting, by the processor, the floor count. The second subject configuration may be determined, by the processor, by (e.g., automatically) receiving second spatially resolved data from the second instant that is the period of time after the first instant, the subject being within the environment at the second instant (e.g., and having moved or not); (e.g., automatically) identifying, by the processor, the second subject configuration of the subject based, at least in part, on the second spatially resolved data; and (e.g., automatically) determining, by the processor, a second spatial measurement between the second subject configuration and the floor configuration.

The method may be stored as instructions on a memory included in a system that when executed by the processor cause the processor to carry out steps of the method. The system may further comprise an ambient sensor; and the processor.

Elements of embodiments involving one aspect of the invention (e.g., compositions, e.g., systems, e.g., methods) can be applied in embodiments involving other aspects of the invention, and vice versa. All publications referenced in this document by publication number are incorporated herein by reference in their entireties. It is expressly contemplated that one or more features of a system or method described herein, in this summary section or elsewhere, may be combined with one or more other features described herein, in this summary section or elsewhere, as additional embodiment(s), so long as operability is maintained.

BRIEF DESCRIPTION OF THE FIGURES

The foregoing and other objects, aspects, features, and advantages of the present disclosure will become more apparent and better understood by referring to the following description taken in conjunction with the accompanying drawings, in which.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

DEFINITIONS

In order for the present disclosure to be more readily understood, certain terms are first defined below. Additional definitions for the following terms and other terms are set forth throughout the specification.

As used herein, "on-the-floor detection" refers to the identification that a person has fallen, toppled, slumped, or otherwise involuntarily failed to maintain a purposeful upright (e.g., standing or sitting) posture. For descriptive clarity, we employ the term "on-the-floor" in this document, but the surface upon which the person is disposed may be any surface, such as a couch, and not just a floor.

As used herein, "privacy" refers to preventing the acquisition and/or dissemination of personal images or photos.

DETAILED DESCRIPTION OF CERTAIN EMBODIMENTS

The systems and methods described herein relate to on-the-floor detection using measurements from one or more ambient (i.e., not worn) sensors. The sensors may encompass a wide variety of modalities, including video and depth (spatial).

Figure 1:
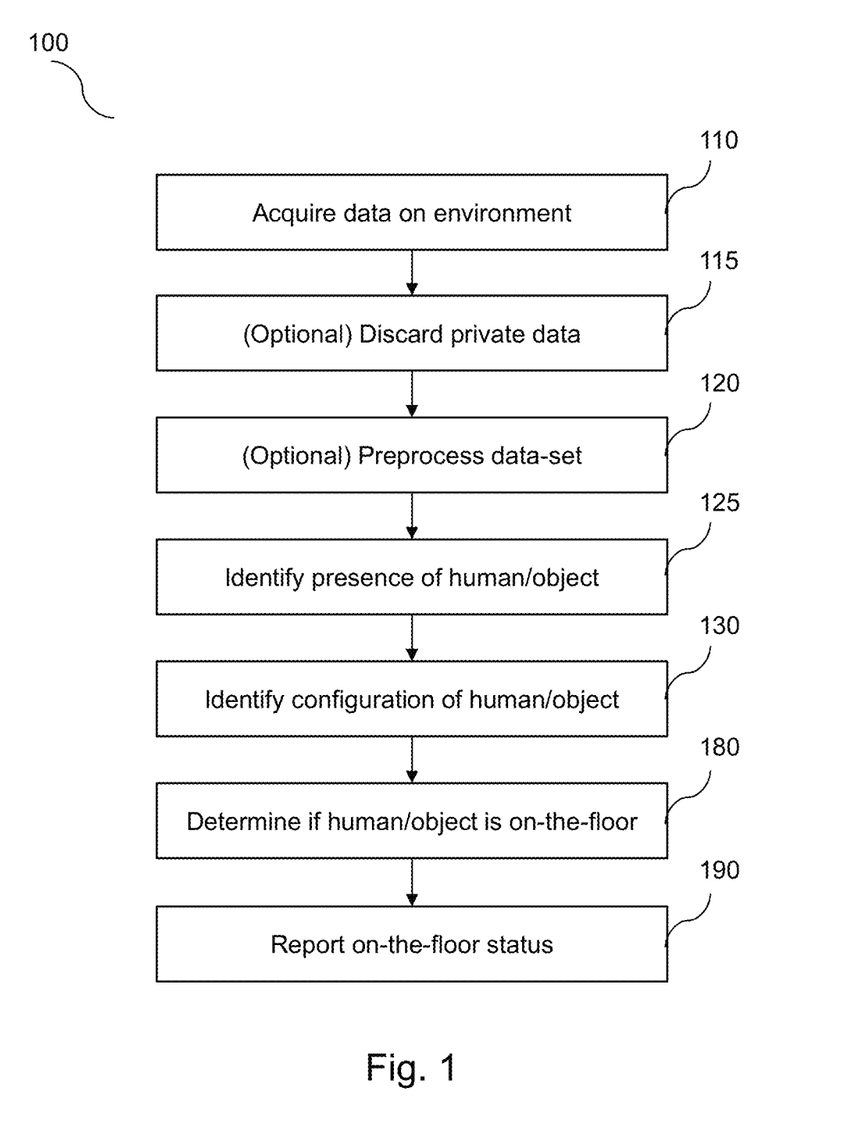
FIG. 1 is a high-level block flow diagram of a method of on-the-floor detection of a human, or other object, without the need for wearables or trajectories, according to an illustrative embodiment.

FIG. 1 is a flowchart of an example of a method 100 of on-the-floor detection. In Step 110, a data set is gathered via one or more sensors on the environment to be monitored. A wide variety of sensors capable of gathering data on an environment may be utilized, including but not limited to: webcams (visual data); depth cameras (spatial data); and bolometers (temperature data). In Step 115, optionally, some data may be discarded to protect privacy. For example, the portion of an image corresponding to a human face may be discarded. In Step 120, the data is, optionally, preprocessed in preparation for the calculations that follow. Such preprocessing may include, for example, image processing, image resizing, filtering, obscuring, cleaning, and normalization, as are standard in the art.

In Step 125, the presence of a human is identified through the use of, for example, machine learning and/or pattern recognition techniques. If more than one human is present, this step and the following steps may optionally be repeated for each human. Examples of methods to identify the presence of a human are described in U.S. Pat. Nos. 9,341,464 and 9,600,993 and 9,737,239 and 9,817,017 and 9,974,466 and 10,013,756 and PCT/US/1744936, which are hereby incorporated by reference in their entirety. In addition, or alternately, non-human objects may be identified via similar techniques.

In Step 130, the configuration of the human identified in Step 125 is identified. As used herein, the term "human configuration" refers to a set of data corresponding to the disposition and/or spatial locations of the portions of the anatomy of the human. In certain embodiments, the human configuration may include information localizing the center-of-mass of the human, pose, aspect ratio, and joint locations. Methods of identifying the configuration of a human are described in U.S. Pat. Nos. 9,341,464 and 9,600,993 and 9,737,239 and 9,817,017 and 9,974,466 and 10,013,756 and PCT/US17/44936, which are hereby incorporated by reference in their entirety. In addition, or alternately, the configuration of a non-human object may be determined via similar techniques.

In Step 180, the output of Step 130 is used to determine whether the human is on-the-floor. In some embodiments of the invention, Step 180 does not require any historical information, such as a trajectory; in other words, Step 180 can be performed on a single "snapshot" of human configuration. In addition, or alternately, the on-the-floor status of a non-human object may be determined via similar techniques.

In Step 190, the on-the-floor status is reported (for example, to an automated monitoring service, to a caregiver, or to an emergency provider).

Figure 2:
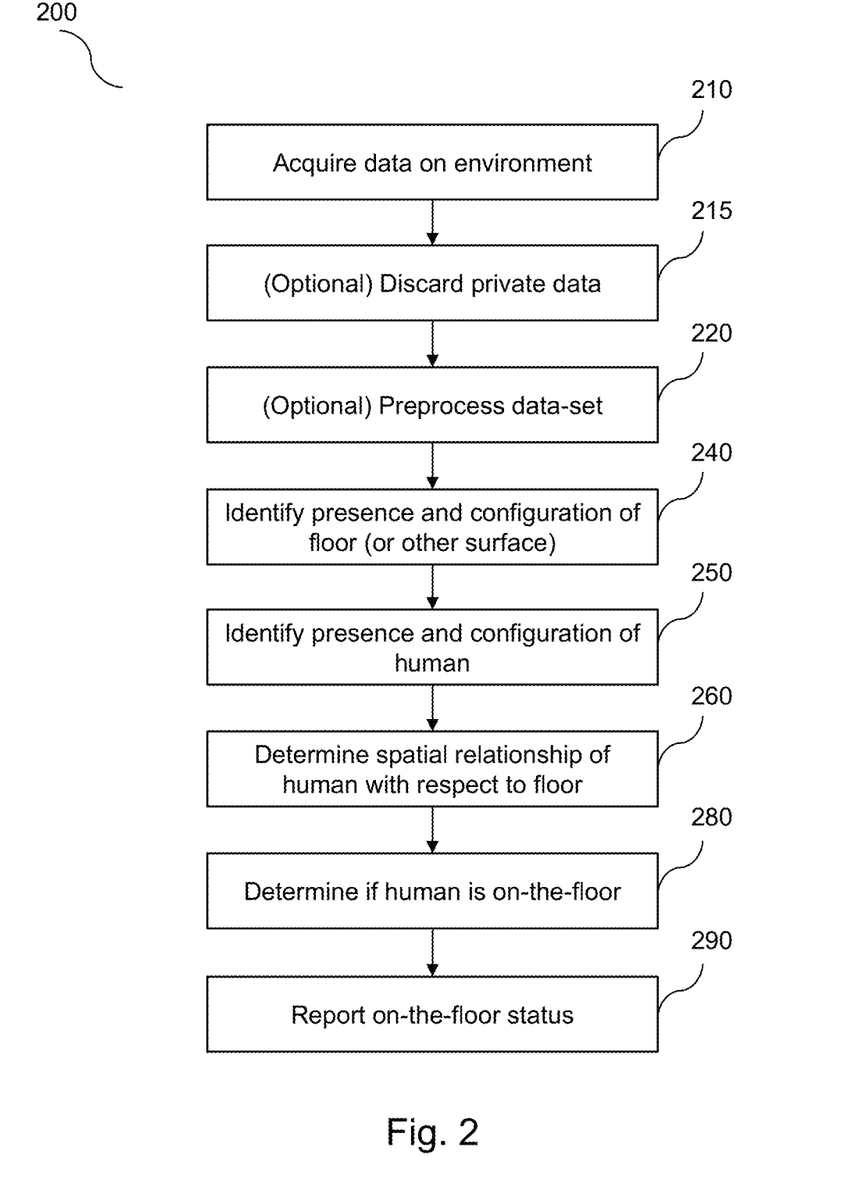
FIG. 2 is a high-level block flow diagram illustrating a method 200 of on-the-floor detection where a human and a surface (e.g., a floor or couch) are identified, according to an illustrative embodiment.

FIG. 2 is a flowchart of an example of a method 200 of on-the-floor detection without the need for wearables or trajectories, in which a surface (e.g., a floor, a couch, the top of a piece of furniture) is identified. Steps 210-220 are equivalent to the like-numbered steps in FIG. 1. In Step 240, the presence and configuration of the surface is determined. In certain non-limiting embodiments, the surface configuration may comprise, for example, a location of the surface within the environment. Methods of finding surfaces are known in the art, and include, for example: calculating normal to surfaces, isolating planes, and finding the lowest plane. In Step 250, the presence and configuration of a human are identified, as described above. In Step 260, the spatial relationship of the human to the surface is determined; for example, the spatial relationship may be an average closest distance from various locations found on the human (e.g., one or more joints) and the surface. In another embodiment, the closest distance between the center-of-mass of the human and the surface is determined. Step 280 uses the output of Step 260 to determine on-the-floor status; for example, by comparing a distance determined in Step 260 against a predetermined value. For example, in certain embodiments, Step 290 reports the on-the-floor status output of Step 280, as described above.

Figure 3:
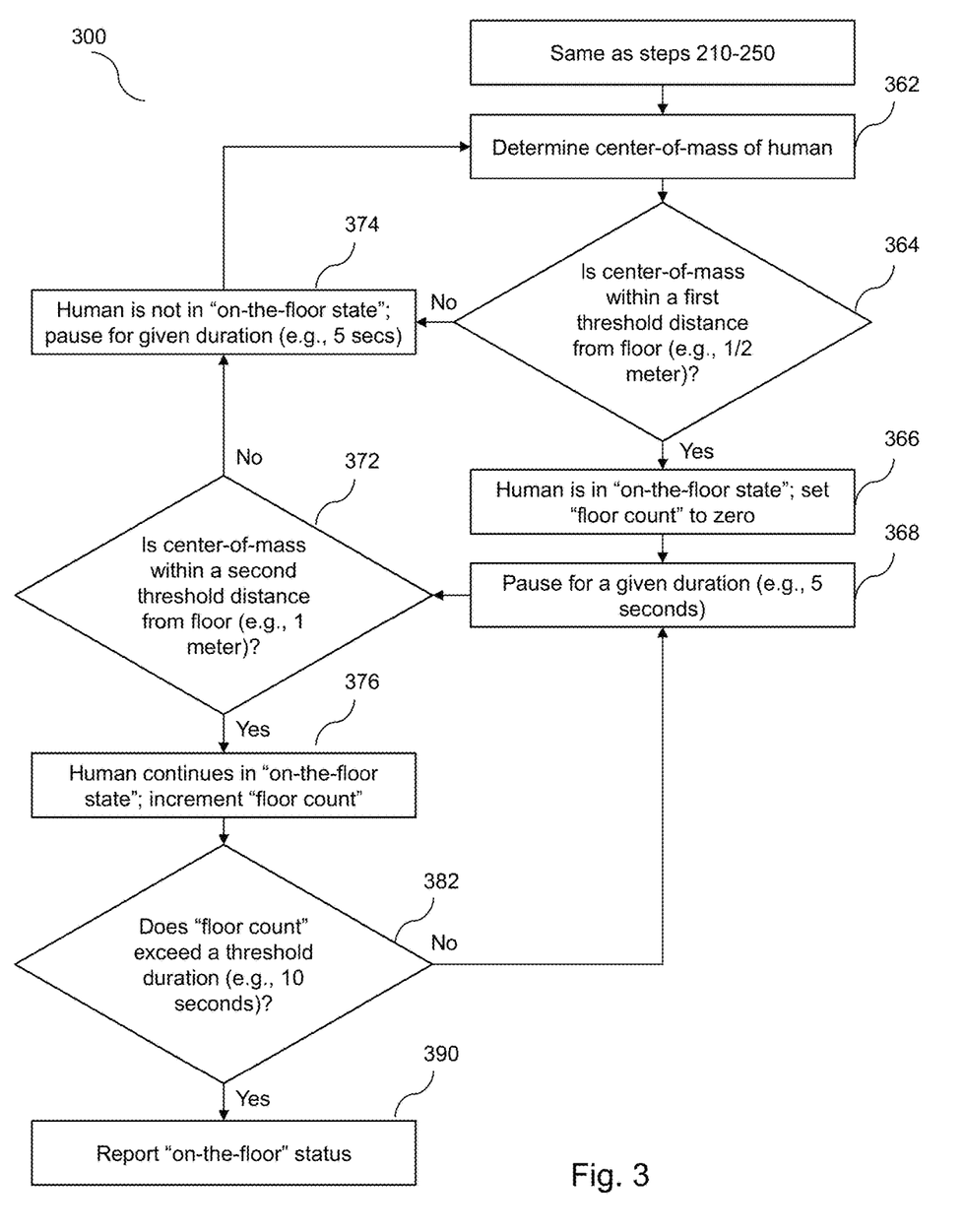
FIG. 3 is a high-level block flow diagram illustrating a method 300 of on-the-floor detection of where the center-of-mass of a human is identified, according to an illustrative embodiment.

FIG. 3 is a flowchart of an example of a method 300 of on-the-floor detection without the need for wearables or the calculation of fall trajectories. In some embodiments, the method utilizes a specific metric of the human (e.g., the center-of-mass in this case) and its relationship to a surface (e.g., the floor). In some embodiments, the surface is a floor that has been identified, though the use of the floor in this example is not intended to be limiting, as described above.

FIG. 3 begins with steps equivalent to Steps 210-250. Step 362 determines the mathematical center-of-mass of the human using the data acquired from the ambient sensor. Step 364 then tests whether the distance from the center-of-mass is located within a first distance from the floor. In certain embodiments, the distance from the floor to the center-of-mass of the human is calculated as the smallest distance separating the center-of-mass and the floor. If Step 364 reports "no" (i.e., the center-of-mass is not within the particular distance to the floor), then the human is not in "on-the-floor state", and Step 374 pauses for some interval of time before returning to Step 362. If Step 364 reports "yes", then the human is in "on-the-floor state", and Step 366 initializes a "floor count" which will be used to track how long the "on-the-floor state" persists. Step 368 pauses for some interval of time (e.g., no more than 2 seconds, 5 seconds, 10 seconds, 30 seconds, or more) before moving to Step 372.

Step 372 tests whether the center-of-mass is located within a second distance from the floor (e.g., no more than 0.5 meter, 1 meter, 1.5 meters, or more). In some embodiments, the first distance of Step 364 differs from the second distance of Step 372 in order to make it more difficult to exit the "on-the-floor state" than it is to enter into it. This could be achieved, for example, by setting the second distance to be greater than the first distance. If at Step 372, the system reports "no", then the human is no longer in "on-the-floor state", and Step 374 pauses for an interval of time (e.g., no more than 2 seconds, 5 seconds, 10 seconds, 30 seconds, or more) before returning to Step 362. If Step 372 reports "yes", then the human remains in "on-the-floor state", and Step 376 increments the "floor count". Step 382 tests whether the "floor count" has exceeded some cumulative duration (e.g., no more than 10 seconds, 30 seconds, 60 seconds, or more). If the cumulative duration has not exceeded the threshold duration as assessed in Step 382, a report of "no" is submitted and the process returns to Step 368. If the cumulative duration has exceeded the threshold duration, Step 382 reports "yes", then Step 390 reports a confirmed on-the-floor status. In certain embodiments, the report may be submitted to a third-party alarm or monitoring service.

In FIG. 3, the center-of-mass of the human is used to determine the spatial relationship of the human with the floor. However, other metrics may be used instead of, or in addition to, the center-of-mass. Examples of other metrics that may be used include: pose (e.g., sitting on the floor versus lying on the floor); aspect ratio of the body (e.g., mostly horizontal versus mostly vertical); and locations of joints (e.g., the joint locations of the upper body, whether singly or combined [e.g., by averaging the joint locations]).

In Step 190 of FIG. 1 and like-numbered Steps in FIGS. 2-3 (i.e., 290 and 390), the on-the-floor detection result may be, for example, relayed to a user; stored via a method such as a database or disk storage; and/or sent over the internet to a website, server, or other processing step such as a phone alert. This would allow, for example, 3rd party monitoring services to provide alerts to individuals or services that may be of assistance to the human, who is in distress after the fall.

Network and Computing Implementation

Figure 4:
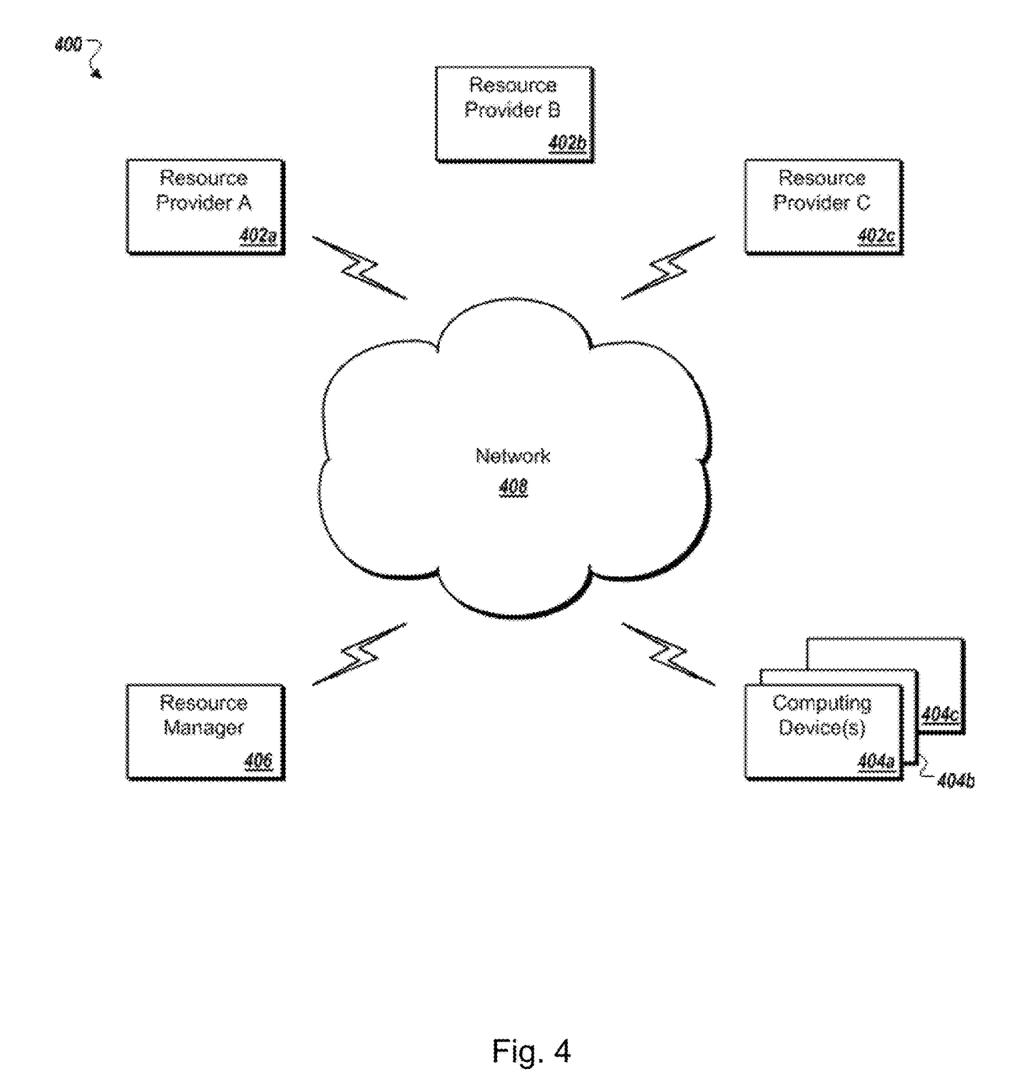
FIG. 4 is a block diagram of an exemplary cloud computing environment 400 used in certain embodiments.

As shown in FIG. 4, an implementation of a network environment 400 for use in providing systems, methods, and architectures as described herein is shown and described. In brief overview, referring now to FIG. 4, a block diagram of an exemplary cloud computing environment 400 is shown and described. The cloud computing environment 400 may include one or more resource providers 402a, 402b, 402c (collectively, 402). Each resource provider 402 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 402 may be connected to any other resource provider 402 in the cloud computing environment 400. In some implementations, the resource providers 402 may be connected over a computer network 408. Each resource provider 402 may be connected to one or more computing device 404a, 404b, 404c (collectively, 404), over the computer network 408.

The cloud computing environment 400 may include a resource manager 406. The resource manager 406 may be connected to the resource providers 402 and the computing devices 404 over the computer network 408. In some implementations, the resource manager 406 may facilitate the provision of computing resources by one or more resource providers 402 to one or more computing devices 404. The resource manager 406 may receive a request for a computing resource from a particular computing device 404. The resource manager 406 may identify one or more resource providers 402 capable of providing the computing resource requested by the computing device 404. The resource manager 406 may select a resource provider 402 to provide the computing resource. The resource manager 406 may facilitate a connection between the resource provider 402 and a particular computing device 404. In some implementations, the resource manager 406 may establish a connection between a particular resource provider 402 and a particular computing device 404. In some implementations, the resource manager 406 may redirect a particular computing device 404 to a particular resource provider 402 with the requested computing resource.

Figure 5:
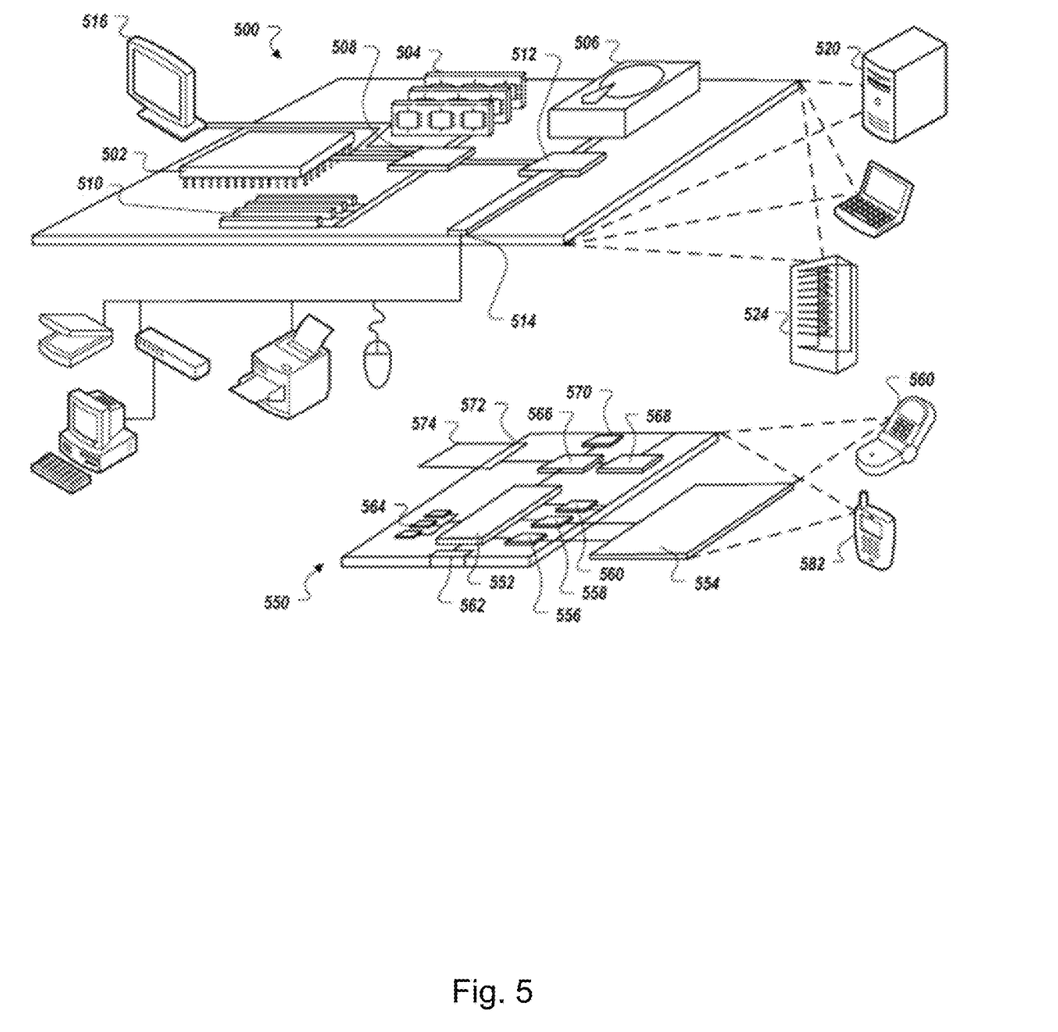
FIG. 5 is a block diagram of an example computing device and an example mobile computing device, for use in illustrative embodiment.

FIG. 5 shows an example of a computing device 500 and a mobile computing device 550 that can be used to implement the techniques described in this disclosure. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system). Thus, as the term is used herein, where a plurality of functions are described as being performed by "a processor", this encompasses embodiments wherein the plurality of functions are performed by any number of processors (one or more) of any number of computing devices (one or more). Furthermore, where a function is described as being performed by "a processor", this encompasses embodiments wherein the function is performed by any number of processors (one or more) of any number of computing devices (one or more) (e.g., in a distributed computing system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provide as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth®, Wi-Fi™, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

In certain embodiments, the computer programs comprise one or more machine learning modules. As used herein, a machine learning module refers to a computer implemented process (e.g., function) that implements one or more specific machine learning algorithms. The machine learning module may include, for example, one or more artificial neural networks. In certain embodiments, two or more machine learning modules may be combined and implemented as a single module and/or a single software application. In certain embodiments, two or more machine learning modules may also be implemented separately, e.g., as separate software applications. A machine learning module may be software and/or hardware. For example, a machine learning module may be implemented entirely as software, or certain functions of a CNN module may be carried out via specialized hardware (e.g., via an application specific integrated circuit (ASIC)).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Elements of different implementations described herein may be combined to form other implementations not specifically set forth above. Elements may be left out of the processes, computer programs, databases, etc. described herein without adversely affecting their operation. In addition, the logic flows depicted in the figures do not require the particular order shown, or sequential order, to achieve desirable results. Various separate elements may be combined into one or more individual elements to perform the functions described herein.

It should be understood that the order of steps or order for performing certain action is immaterial so long as the invention remains operable. Moreover, two or more steps or actions may be conducted simultaneously.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of detecting that an object is on-the-floor, the method comprising:
   receiving, by a processor of a computing device, environmental data;
   automatically identifying within the environmental data, by the processor, one or more objects and a surface;
   automatically identifying within the environmental data, by the processor, a configuration of each of the one or more objects, wherein the configuration comprises a center-of-mass; and
   automatically determining, by the processor, an on-the-floor status for each of the one or more objects,
   wherein, for each of the one or more objects, the determining of the on-the-floor status comprises determining whether the center-of-mass of the object is located within a threshold distance to the surface,
   wherein the method occurs without using a sensor worn by the object and without using a historic trajectory of movement of the object.

2. The method of claim 1, wherein the environmental data corresponds to a spatial environment and is one or more of visual data, spatial data, temperature data, depth data.

3. The method of claim 1, wherein the automatically identifying one or more objects utilizes one or more of machine learning, deep learning, pattern recognition, neural network.

4. The method of claim 1, wherein the one or more objects comprises one or more of a human, an animal, and an inanimate object.

5. The method of claim 1, wherein, for each of the one or more objects, the determining of the on-the-floor status comprises determining, at least in part, a duration of proximity by the object near the surface.

6. The method of claim 1, wherein the surface is a non-floor surface.

7. The method of claim 1, wherein personal or private data are removed from the environmental data.

8. The method of claim 1, wherein the one or more objects comprises a human who has fallen to a floor or other surface.

9. The method of claim 1, wherein the environmental data corresponds to a spatial environment of the one or more objects at a particular instant.

10. The method of claim 1, wherein the ambient sensor is one or more members selected from the group consisting of: an optical camera, a bolometer, and an acoustic sensor.

11. A system for detecting on-the-floor status of an object, the system comprising:
    an ambient sensor;
    a processor; and
    a memory storing instructions thereon, wherein the instructions, when executed by the processor, cause the processor to:
      receive environmental data;
      automatically identify one or more objects and a surface within the environment;
      automatically identify a configuration for each object, wherein the configuration comprises a center-of-mass; and
      automatically determine on-the-floor status for each of the one or more objects, wherein, for each of the one or more objects, the determining of the on-the-floor status comprises determining whether the center-of-mass of the object is located within a threshold distance to the surface,
    wherein the instructions do not use a sensor worn by the object or a historic trajectory of movement of the object.

12. The system of claim 11, wherein the environmental data corresponds to a spatial environment and is one or more of visual data, spatial data, temperature data, depth data.

13. The system of claim 11, wherein the automatically identifying one or more objects utilizes one or more of machine learning, deep learning, pattern recognition, neural network.

14. The system of claim 11, wherein the one or more objects comprises one or more of a human, an animal, and an inanimate object.

15. The system of claim 11, wherein, for each of the one or more objects, the determining of the on-the-floor status comprises determining, at least in part, a duration of proximity by the object near the surface.

16. The system of claim 11, wherein the surface is a non-floor surface.

17. The system of claim 11, wherein personal or private data are removed from the environmental data.

18. The system of claim 11, wherein the one or more objects comprises a human who has fallen to a floor or other surface.

19. The system of claim 11, wherein the environmental data corresponds to a spatial environment of the one or more objects at a particular instant.

20. The system of claim 11, wherein the ambient sensor is one or more members selected from the group consisting of: an optical camera, a bolometer, and an acoustic sensor.

* * * * *